(12) United States Patent
Kerner et al.

(10) Patent No.: US 11,237,247 B2
(45) Date of Patent: Feb. 1, 2022

(54) TRANSCEIVER SYSTEM WITH QUANTIZATION NOISE MITIGATION

(71) Applicant: Apple Inc., Cupertino, CA (US)

(72) Inventors: Michael Kerner, Tel Mond (IL); Zohar Agon, Tel Aviv (IL); Michael Ney, Beer Sheva (IL)

(73) Assignee: Apple Inc., Cupertino, CA (US)

(*) Notice: Subject to any disclaimer, the term of this patent is extended or adjusted under 35 U.S.C. 154(b) by 23 days.

(21) Appl. No.: 16/893,938

(22) Filed: Jun. 5, 2020

(65) Prior Publication Data
US 2021/0382138 A1    Dec. 9, 2021

(51) Int. Cl.
| | |
|---|---|
| G01S 7/292 | (2006.01) |
| H04B 17/10 | (2015.01) |
| H04L 27/34 | (2006.01) |

(52) U.S. Cl.
CPC ............ *G01S 7/292* (2013.01); *H04B 17/103* (2015.01); *H04L 27/3405* (2013.01)

(58) Field of Classification Search
CPC combination set(s) only.
See application file for complete search history.

(56) References Cited

U.S. PATENT DOCUMENTS

| | | | |
|---|---|---|---|
| 6,549,067 | B1 | 4/2003 | Kenington |
| 7,095,799 | B2 | 8/2006 | Braithwaite |
| 8,036,606 | B2 * | 10/2011 | Kenington ............. H04B 1/525 455/78 |
| 2015/0145567 | A1 * | 5/2015 | Perrott ................. G04F 10/005 327/156 |
| 2016/0266245 | A1 * | 9/2016 | Bharadia ................ G01S 13/42 |
| 2018/0321359 | A1 | 11/2018 | Bharadwaj et al. |
| 2019/0013797 | A1 | 1/2019 | Thuries et al. |

OTHER PUBLICATIONS

International Search Report and Written Opinion in PCT Appl. No PCT/US2021/034299 dated Sep. 10, 2021, 16 pages.
Hurst et al., "DAC Quantization-Noise Cancellation in an Echo-Canceling Transceiver," IEEE Transactions on Circuits and Systems—II: Express Briefs, vol. 55, No. 2, Feb. 2008, pp. 111-115.

* cited by examiner

*Primary Examiner* — Junpeng Chen
(74) *Attorney, Agent, or Firm* — Kowert, Hood, Munyon, Rankin & Goetzel, P.C.; Erik A. Heter (57) ABSTRACT

A transceiver having quantization noise compensation is disclosed. The transceiver includes transmitter and receiver circuits. The transmitter is configured to receive and quantize a digital signal to generate a quantized signal. The quantized signal is then converted into an analog transmit signal and transmitted as a wireless signal. The receiver circuit is configured to receive a reflected version of the wireless signal and generate an analog receive signal based thereon. The analog receive signal is converted into a digital receive signal. Thereafter, the receiver cancels quantization noise from the digital receive signal to produce a digital output signal that can be utilized for further processing.

20 Claims, 6 Drawing Sheets

TRANSCEIVER SYSTEM WITH QUANTIZATION NOISE MITIGATION

BACKGROUND

Technical Field

This disclosure is directed to systems that transmit and receive radio frequency (RF) signals, and more particularly, to noise compensation in such systems.

Description of the Related Art

In recent years, radio frequency (RF) based sensing applications have been implemented on various types of consumer devices, such as smart phones, smart watches, tablet computers, and so on. Applications that utilize RF based sensing may include motion detection, collision avoidance, non-contact user interfacing, and so on.

To conduct RF sensing, a device may transmit pulses of RF signals and receive their reflections, basically functioning as a radar. Data from the reflections may then be processed to determine information regarding objects surrounding the device. For some applications, pulses may be continuously transmitted and reflections received, with data being continuously processed.

SUMMARY

A transceiver having quantization noise compensation is disclosed. In one embodiment, a transceiver includes transmitter and receiver circuits. The transmitter is configured to receive and quantize a digital transmit signal to generate a quantized signal. The quantized signal is then converted into an analog transmit signal and transmitted as a wireless signal. The receiver circuit is configured to receive a reflected version of the wireless signal and generate an analog receive signal based thereon. The analog receive signal is converted into a digital receive signal. Thereafter, the receiver cancels quantization noise from the digital receive signal to produce a digital output signal that can be utilized for further processing.

In one embodiment, the transmitter includes a quantization circuit coupled to receive the digital transmit signal and configured to perform the quantization to generate the quantized signal. The receiver includes a compensation circuit that is coupled to receive both the digital transmit signal and the quantized signal, as well as the digital receive signal. Alternatively, the receiver may receive a ratio signal indicative of an amount of quantization noise that is introduced during the quantization. The compensation unit utilizes the digital transmit signal and the quantized signal to cancel out the noise induced by the quantization process. The resulting output, after cancelation of the quantization noise, is the digital output signal.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a transceiver circuit in which compensation is provided to remove quantization noise from a signal in a receiver. In various types of systems used for object detection (including, but not limited to, those implemented in, e.g., smart phones) transmitters may generate wideband signals to enable a high resolution. For example, to obtain a resolution of approximately 2 centimeters, a waveform of approximately 7 GHz may be required. To obtain this type of bandwidth, a sampling rate of at least 14 GHz is required. For processing such signals in the digital domain, an effective number of bits (ENOB) to achieve good noise performance approximately 9 bits. Such systems utilize digital-to-analog converters (DACs) in order to convert the signals from the digital domain into the analog domain for transmission. Thus, the use of a greater number of bits may reduce the quantization noise present in both the transmitted signal and reflections thereof received and processed by the transmitting device. Generally speaking, there is an inversely proportional relationship between the number of bits used in a DAC in the transmitter chain and the noise floor. As the noise floor is lowered, the ability to detect objects having smaller reflected signal intensity is increased thus improving the detection sensitivity.

Implementation of DACs with a high number of bits can be difficult, as the complexity and resources consumed by DACs increases with the number of bits used to generate the output analog signal. In the present disclosure, a transceiver system is implemented that allows quantization noise to be reduced without a corresponding increase in the number of bits of a DAC used in the transmit chain. In various embodiments, quantization information from the transmit chain may be provided to the receive chain and used as a basis to remove quantization noise in received signals. This may, in turn, allow for a reduced noise floor with a smaller ENOB at the DAC while achieving the performance of a system with a higher ENOB at the DAC. Using the 9-bit example discussed above, various embodiments of a transceiver system may be implemented using a 6-bit DAC while achieving substantially the same performance. Alternatively, a transceiver utilizing a 9-bit DAC within the architecture described herein may achieve better performance in resolving objects, due to a lower noise floor, than a transceiver utilizing the same sized DAC without the removal of quantization noise. Various embodiments of such systems are now discussed in further detail.

Figure 1:
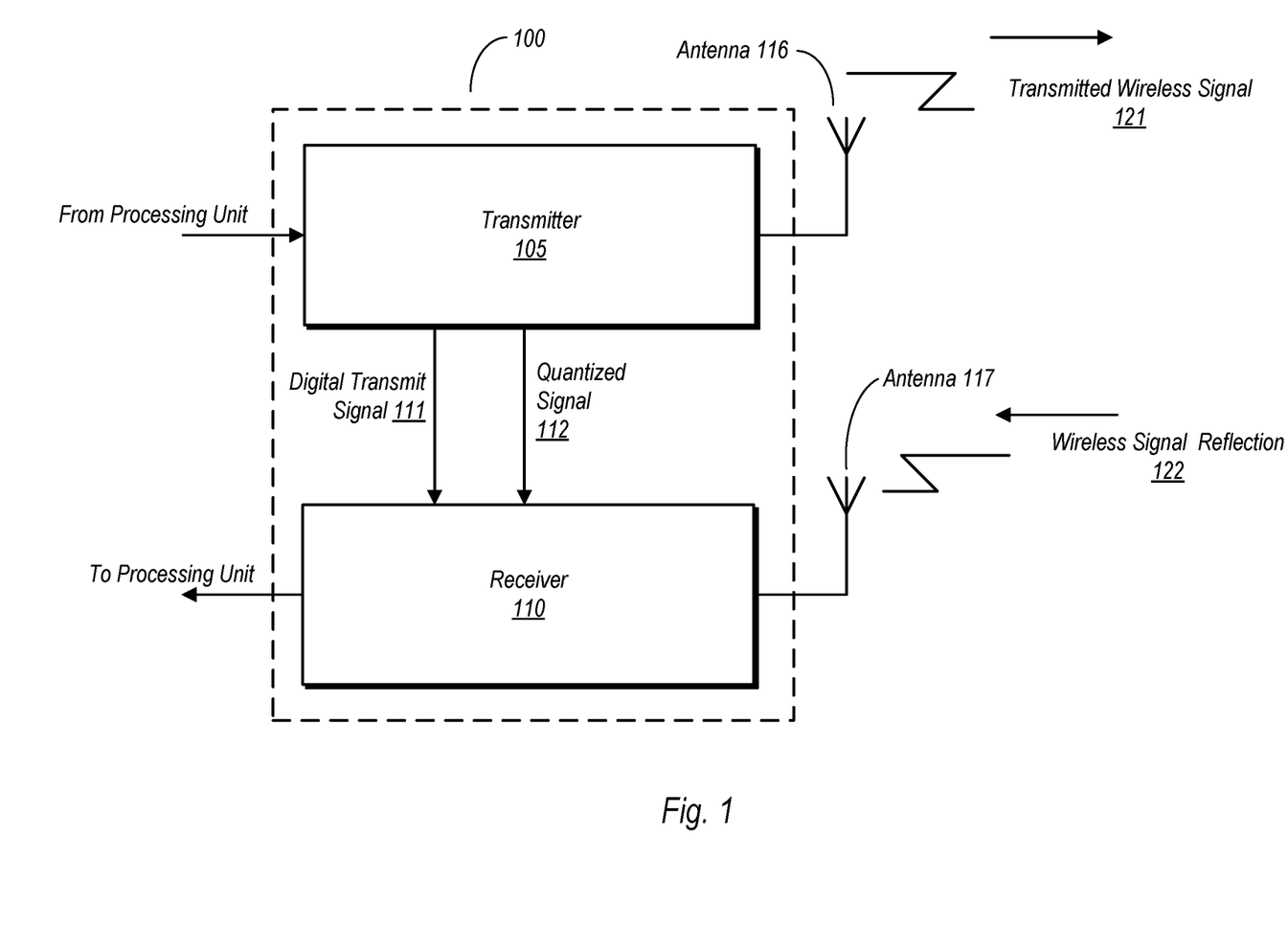
FIG. 1 is a block diagram of one embodiment of a transceiver circuit having a transmitter and a receiver.

FIG. 1 is a block diagram of one embodiment of a transceiver circuit having a transmitter and a receiver. In the embodiment shown, transceiver 100 includes a transmitter 105 and a receiver 110. Although not shown here, both transmitter 105 and receiver 110 may be coupled to a processing unit that generates digital signals to provide the basis for transmitted wireless signals, as well as processes digital signals corresponding receive reflections. Transmitter 105 in the embodiment shown is coupled to an antenna 116 from which wireless signals 121 are transmitted. Receiver 110 in the embodiment shown is coupled to another antenna 117 through which wireless signal reflections 122 are received. It is noted that in some embodiment, a single antenna utilized for both transmitting and receiving may be present, in lieu of the separate antennas shown here.

In the embodiment shown, transmitter 105 receives information from the processing unit and generates digital transmit signals. The digital transmit signal may then be quantized to generate a quantized signal. Using the quantized signal, transmitter 105 generates an analog transmit signal. Thereafter, transmitter 105 transmits wireless signal 121.

Receiver 110 in the embodiment shown receives, at antenna 122, a reflected version of the wireless signal, signal reflection 122. Using signal reflection 122, receiver 110 may generate an analog receive signal. A digital receive signal may then be generated based on the analog receive signal. As shown in FIG. 1, receiver 110 is coupled to receive the digital transmit signal 111 and the quantized signal 112 from transmitter 105. Using digital transmit signal 111 and the quantized signal 112 from transmitter 105, receiver 105 may cancel quantization noise from the digital receive signal in order to generate a receive output signal. The receive output signal may then be forwarded to a processing unit for further processing. It is noted that alternative embodiments are possible and contemplated in which, rather than receiving both transmit signal 111 and quantized signal 112, a ratio signal or other information that is indicative of the quantization noise induced by the quantization process is provided. This information can be used to remove the quantization noise in the receiver chain.

Figure 2:
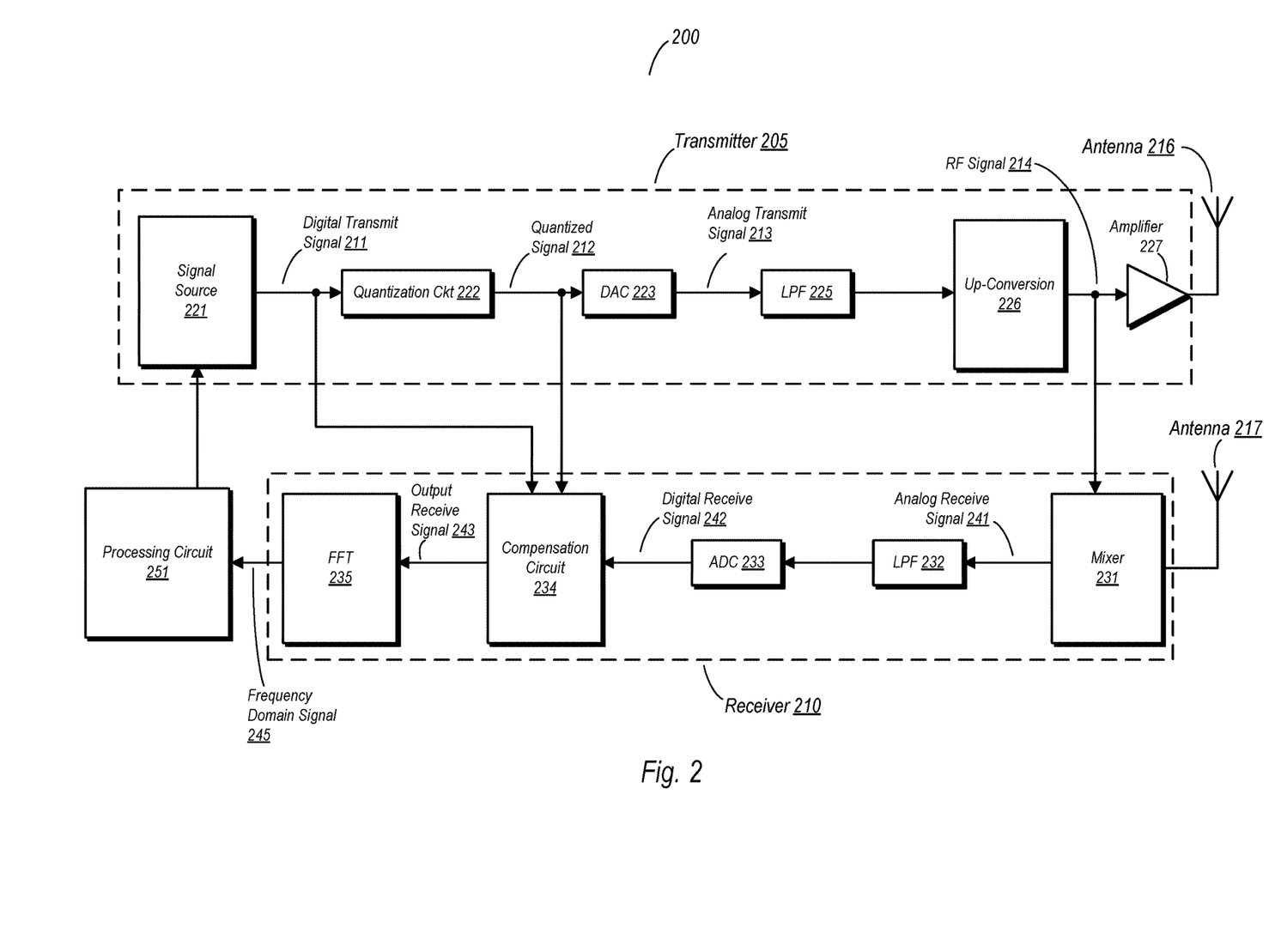
FIG. 2 is a block diagram of one embodiment of a transceiver circuit having a transmitter and a receiver.

FIG. 2 is a block diagram of one embodiment of a transceiver circuit having a transmitter and a receiver. Transceiver 200 in the embodiment shown includes a transmitter 205 and a receiver 210. Additional details of transmitter 205 and receiver 210 are now discussed in further detail.

Transmitter 205 includes a signal source 221 which is configured to generate a digital transmit signal 211 based on information received from a processing circuit (not shown).

The digital transmit signal is provided to a quantization circuit 222, which generates, through quantization, a quantized signal 212 having a lesser number of bits than the digital transmit signal 211. The quantized signal 212 is then provided to digital-to-analog converter (DAC) 223, which outputs an analog transmit signal 213. The analog transmit signal 213 is then filtered, in this example, by low pass filter 225. The filtered version of analog transmit signal 213 is then provided to up-conversion circuit 226, which converts the analog transmit signal from, e.g., a baseband frequency to a radio frequency (RF). Although not explicitly shown, up-conversion circuit 226 may include various circuits used to up-convert signals in frequency, including mixers, local oscillators, and so on. Up-conversion signal outputs a RF signal 214, which is conveyed to amplifier 227. In amplifier 227, the power of RF signal 214 may be increased, with the signal being driven onto antenna 216 and conveyed therefrom as a wireless signal.

Reflections of the transmitted wireless signals are received through antenna 217 and passed to mixer 231. Mixer 231 is also coupled to receive the RF signal 214 output from up-conversion circuit 226. It is noted that, in some embodiments, the signal output from amplifier 227 can be provided to mixer 231 in lieu of RF signal 214. The reflection of the wireless signal is mixed with RF signal 214 to produce an analog receive signal 241. The analog receive signal 214 is filtered by low pass filter 232. The filtered version of analog receive signal 214 is then provided to analog-to-digital converter 233 and converted into digital receive signal 242. The digital receive signal 242 is then forwarded to compensation circuit 234. Using the digital transmit signal 211 and the quantized signal 212 (or information corresponding thereto, such as a ratio between the two), compensation circuit 234 cancels quantization noise from the digital receive signal 242. The receive output signal 243 generated by compensation circuit 234 is forwarded to fast Fourier transform (FFT) circuit 235, where the signal is converted from being a time domain signal to into frequency domain signal 245. This signal is then forwarded to a processing circuit for further processing, such as the analysis of the reflections for the purposes of object detection.

In various embodiments, compensation circuit 234 may utilize the digital transmit signal 211 and the quantized signal 212 to remove quantization noise from the receive signal. The quantization signal 212, with quantization noise included, can be expressed as follows:

$$S_B(nT_s) = S_A[nT_s] \cdot H[nT_s] \quad \text{(Equation 1)},$$

where $S_B(t)$ is the quantized signal, $S_A[nT_s]$ is the digital transmit signal, $H[nT_s]$ is the quantization noise, n is the value sample number value, while $T_s$ is the sampling time interval. Meanwhile, the digital receive signal can be expressed as:

$$S_H(nT_s) = (A_i S_A[nT_s - \Delta t_i] \cdot H[nT_s - \Delta t_i]) \cdot (S_A^*[nT_s] \cdot H^*[nT_s]) \quad \text{(Equation 2)},$$

where $S_H(t)$ is the digital receive signal, and $A_i$ is complex amplitude of a target fat a distance of $R_i$. The value $R_i$ is $c\Delta t_i/2$, where c is the speed of propagation of the RF signal and $\Delta t_i$ is the time between transmission and reception of the signal reflected from the target i. Thus, Equation 2, the digital receive signal, prior to input into compensation circuit 234, includes the quantization noise induced during the quantization process on the transmit side. Without compensation, the noise floor for the digital receive signal 242 is greater than with compensation. While the noise floor can be reduced by having a larger DAC in transmitter 205 (e.g., 9 bits instead of 6), increasing the number of bits of a DAC can add significant complexity.

The signal output from the compensation circuit 234 can be expressed as:

$$S_I(t) = A_i S_A[nT_s - \Delta t_i] \cdot H[nT_s - \Delta t_i] \cdot (S_A^*[nT_s] \cdot H^*[nT_s]) \cdot \frac{1}{H[nT_s - \Delta t_i] \cdot H^*[nT_s]}, \quad \text{(Equation 3)}$$

where $S_I(t)$ is the receive output signal. Equation 3 can be reduced to Equation 4, as follows:

$$S_I(t) = A_i S_A[nT_s - \Delta t_i] \cdot (S_A[nT_s]) \quad \text{(Equation 4)}.$$

The terms having an asterisk represent complex conjugates of their respective values (e.g., H* is the complex conjugate of H). As can be seen in Equation 4, the "H" terms (namely $H[nT_s - \Delta t_i]$ and $H^*[nT_s]$) from Equation 3 cancel out due to the denominator in the fractional expression on the right hand side of the latter. Since the quantization noise "H" terms represent a difference between the digital transmit signal 211 and the quantized signal 212 (and more particularly, quantization noise), canceling these terms effectively removes the quantization noise in a range interval around a range of interest. Accordingly, the digital transmit signal 211, $S_I(nT_s)$, represents a reflected version of the transmitted RF signal that is generated based on digital transmit signal 211, or $S_A[nT_s]$.

Since the quantization noise is canceled out in the manner described above, a lower number of bits can be used to implement DAC 223 of transmitter 205, while still achieving the benefit of a reduced noise floor from a greater number of bits. Alternatively, if the greater number of bits is used to implement DAC 223, the noise floor can be reduced even further. In either case, the noise floor is reduced relative to implementations having a DAC of the same size without a compensation circuit as described above. The reduced noise floor can result in a significant benefit in terms of ability to detect the presence of objects based on reflections in RF sensing systems that utilize the type of compensation disclosed herein.

Figure 3:
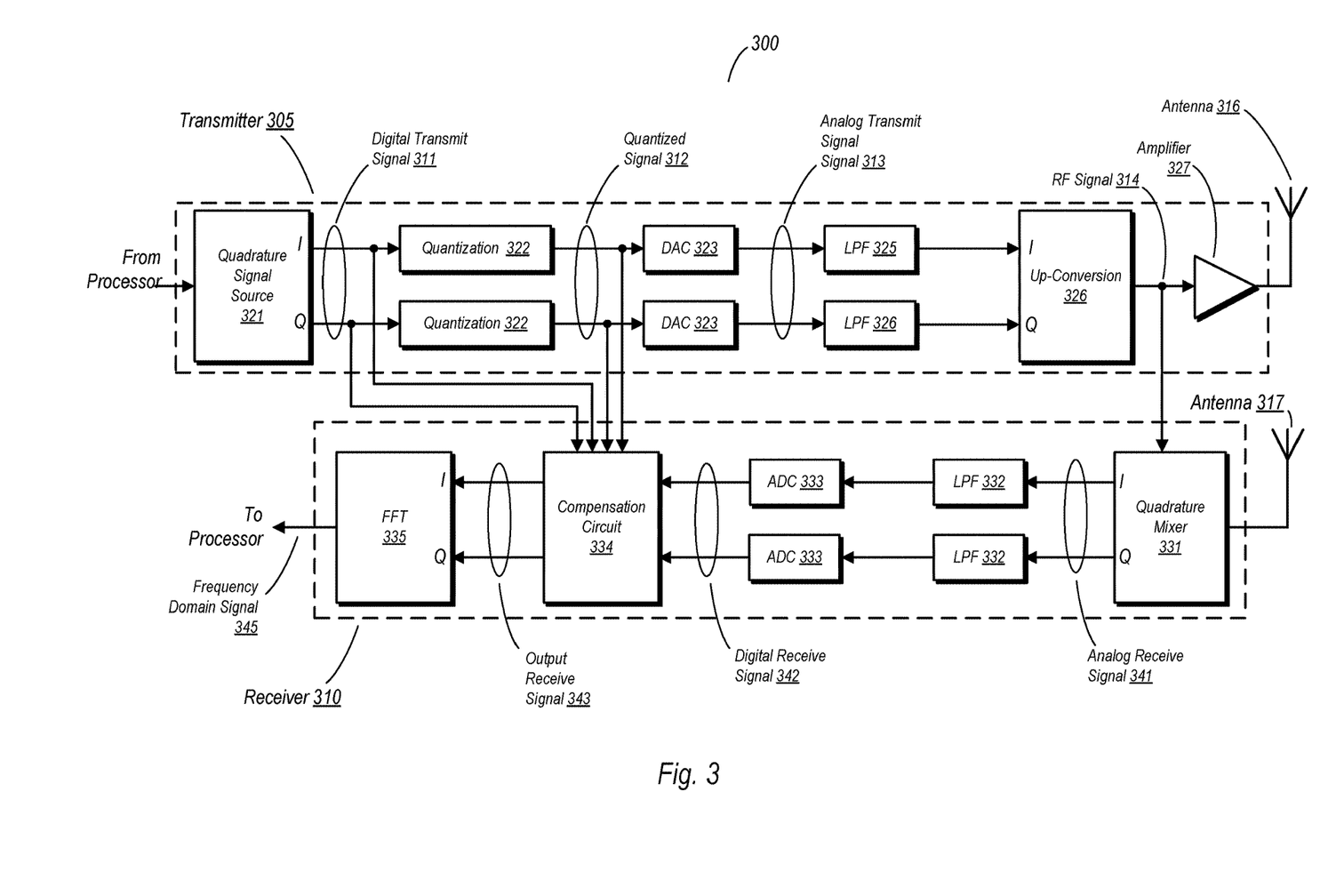
FIG. 3 is a block diagram of one embodiment of a transceiver utilizing quadrature amplitude modulation.

FIG. 3 is a block diagram of one embodiment of a transceiver utilizing quadrature amplitude modulation. In the embodiment shown, transceiver 300 is arranged for transmitting and receiving quadrature amplitude modulated (QAM) signals having an in-phase (I) component and a quadrature (Q) component. Accordingly, transmitter 305 and receiver 310 are both arranged to handle QAM signals in the embodiment of FIG. 3.

In the embodiment shown, quadrature signal source 321 is configured to generate a digital transmit signal 311, which is a QAM signal having I and Q components. The I and Q components of digital transmit signal 311 are provided to quantization circuits 322, each of which performs a quantization process. The quantization circuits 322 output a quantization signal 312 having respective I and Q components. The I and Q components of quantized signal 312 are provided to respective DACs 323. The DACs 323 output I and Q components of an analog transmit signal 313. The I and Q components of analog transmit signal 313 are filtered by respective low pass filters 325 and provided to up-conversion circuit 326. Using circuits such as local oscillators, mixers and so on, the analog transmit signal 313 is converted to RF signal 314 and provided to amplifier 327. The RF signal is then driven onto antenna 316 and transmitted as a wireless signal.

Antenna 317 receives a reflection of the transmitted wireless signal, which is provided to quadrature mixer 331. Quadrature mixer 331 is also coupled to receive RF signal 314. Using RF signal 314 or RF signal at output of amplifier 327, quadrature mixer 331 performs a mixing operation that results the generation of analog receive signal 341. The I and Q components of analog receive signal 341 are filtered by respective instances of low pass filter 332. Thereafter, the filtered I and Q components of analog receive signal 341 are provided to respective instances of ADC 333 to generate corresponding I and Q components of digital receive signal 342. The I and Q components of digital receive signal 342 are then provided to compensation circuit 334. Compensation circuit 334 is additionally coupled to receive the respective I and Q components of the digital transmit signal 311 and quantized signal 312, or in an alternative embodiment, ratio information corresponding to the function H discussed above. Using this information, quantization noise introduced in transmitter 305 may be removed from digital receive signal 342 to generate receive output signal 343, the I and Q components of which are then provided to FFT circuit 335. Thereafter, FFT circuit 335 converts the receive output signal 343 from a time domain signal into frequency domain signal 345. The frequency domain signal 345 may then be forwarded to a processor further processing, e.g., to determine the presence of objects based on the signals received and processed by receiver 310.

Figure 4:
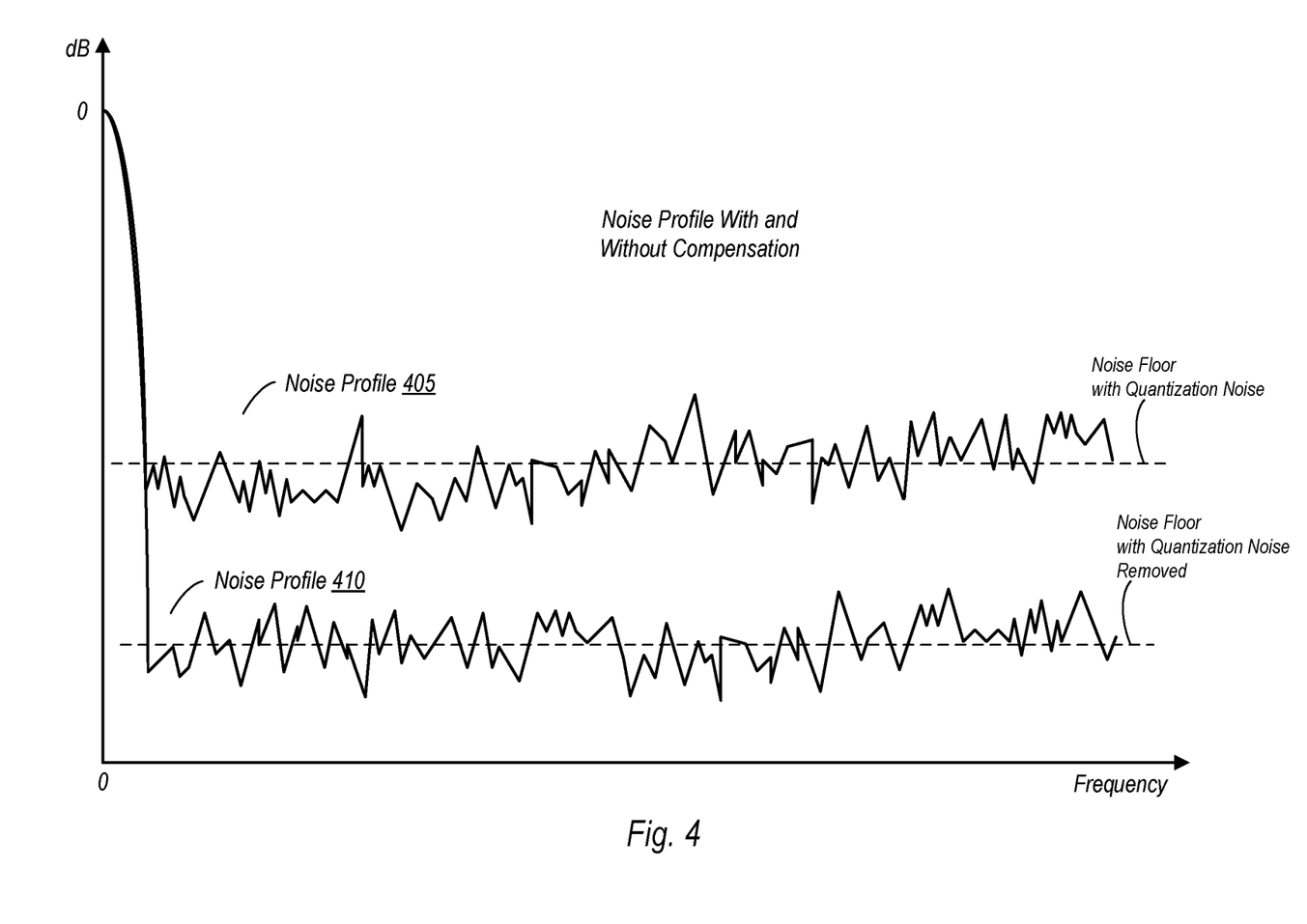
FIG. 4 is a graphic illustration of the effect of removing quantization noise for one embodiment of a receiver circuit.

FIG. 4 is a graphic illustration of the effect of removing quantization noise for one embodiment of a receiver circuit. As discussed above in reference to the embodiments of FIGS. 1-3, compensation is performed in the receiver portion of a transceiver in order to remove quantization noise. FIG. 4 is directed to illustrating this effect by contrasting the effect of compensation in a given embodiment with the lack of compensation in an embodiment that may otherwise be alike (e.g., utilizes DACs/ADCs having the same number of bits).

In the example shown, noise profile 405 corresponds to an embodiment in which no compensation is performed in a receiver for quantization noise. For example, noise profile 405 may apply to the embodiment of FIG. 2 with the exception that compensation circuit 234 is not included, and thus the digital receive signal 242 is provided directly to FFT circuit 235. In contrast, noise profile 410 applied to a transceiver embodiment in which compensation is performed for quantization noise, as shown in FIG. 2, including compensation circuit 234. In both of these embodiments, the DACs and ADCs of may be configured for conversions on the same number of bits (e.g., the DACs in both embodiments may be 6-bit DACs).

As shown in the illustrated example, the noise floor for noise profile 405, measured in decibels, is greater than the noise floor for noise profile 410. One of the implications of the higher noise floor for noise profile 405 is that some weaker reflections may be masked by the excess quantization noise. The added noise may also affect the ability to properly or fully resolve objects detected from signal reflections. The noise floor can also impact other measurable parameters used to characterize a target (e.g., location/range, Doppler frequency or range/Doppler signature, velocity, amplitude, and so on). With regard to the noise floor associated with noise profile 410, some of these same reflections may be more easily detected. Moreover, with the lower noise floor, resolving objects detected from reflections may be easier to accurately perform.

Figure 5:
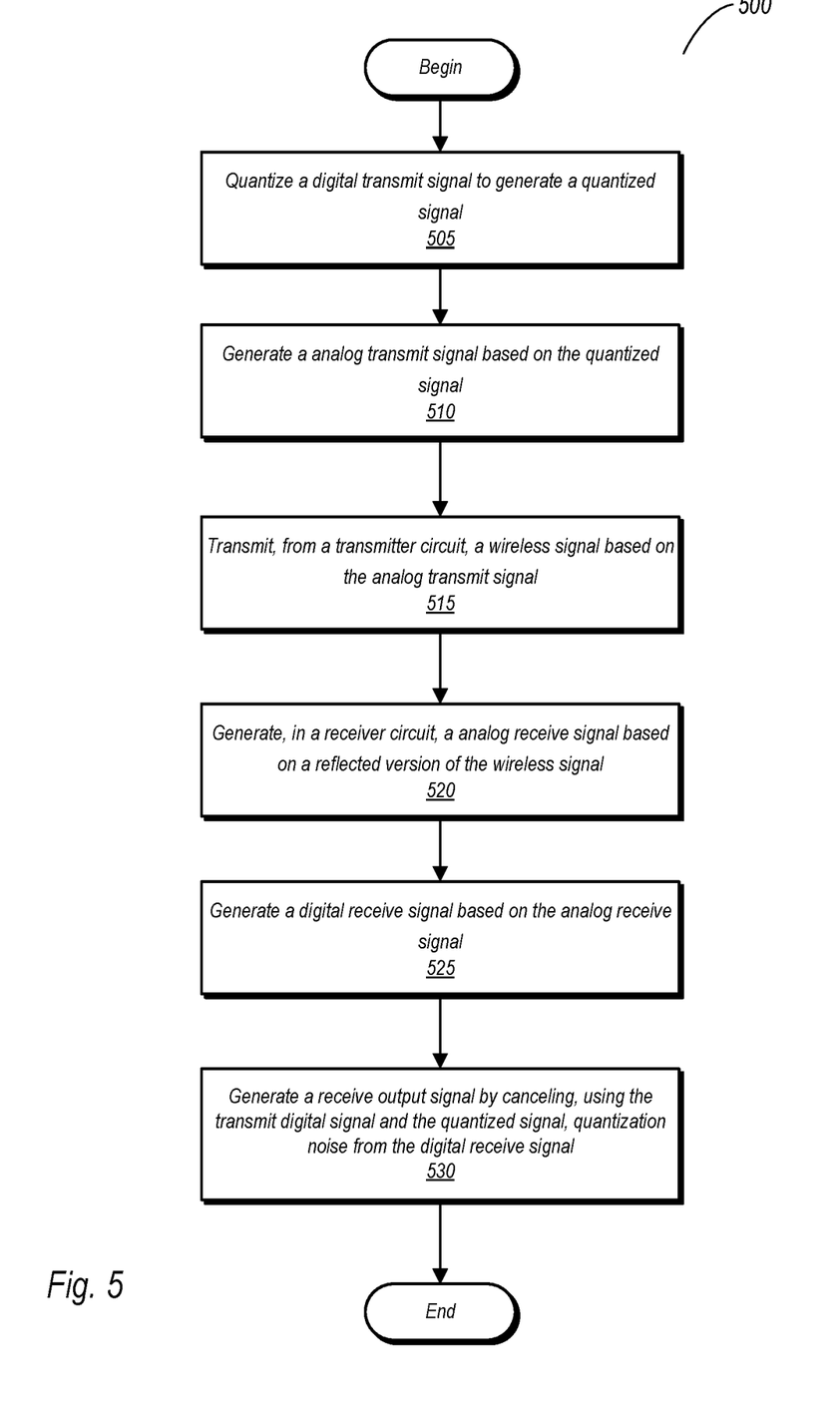
FIG. 5 is a flow diagram illustrating one embodiment of a method for operating a receiver circuit.

FIG. 5 is a flow diagram illustrating one embodiment of a method for operating a transceiver circuit. Method 500 as illustrated in FIG. 5 may be performed with any of the various embodiments of a transceiver as illustrated in FIGS. 1-3 and discussed above. Embodiments of a transceiver system explicitly discussed herein may also be capable of carrying out Method 500 and may thus fall within the scope of this disclosure.

Method 500 includes quantizing a digital transmit signal to generate a quantized signal (block 505), and generating an analog transmit signal based on the quantized signal (block 510). The method further includes transmitting, from a transmitter circuit, a wireless signal based on the analog transmit signal (block 515). The transmitted signal may then be reflected off of one or more objects. The method thus includes generating, in a receiver circuit, an analog receive signal based on a reflected version of the wireless signal (block 520). Thereafter, the method includes generating a digital receive signal based on the analog receive signal (block 525) and, and further includes generating a receive output signal by canceling, using the transmit digital signal and the quantized signal, quantization noise from the digital receive signal (block 530).

In various embodiments, canceling quantization noise from the digital receive signal comprises the receive circuit eliminating quantization noise from the digital receive signal using information from the transmit chain regarding the signals conveyed therein before and after quantization. The receive chain of the transceiver system may thus receive the transmit digital signal and the quantized signal, or alternatively, information indicative of the quantization noise (e.g., the H function discussed above). In some embodiments, the method includes the receiver circuit converting the receive output signal from a time-domain signal to a frequency domain signal (e.g., using an FFT circuit).

In some embodiments, the analog transmit signal and the analog receive signal are quadrature amplitude modulation (QAM) signals having respective in-phase and quadrature components. However, embodiments using other types of modulation are possible and contemplated.

In various embodiments, generating the wireless signal by up-converting a carrier frequency of the analog transmit signal using up-conversion circuitry. Similarly, in some embodiments, generating the analog receive signal comprises mixing the wireless signal with the reflection of the wireless signal.

Figure 6:
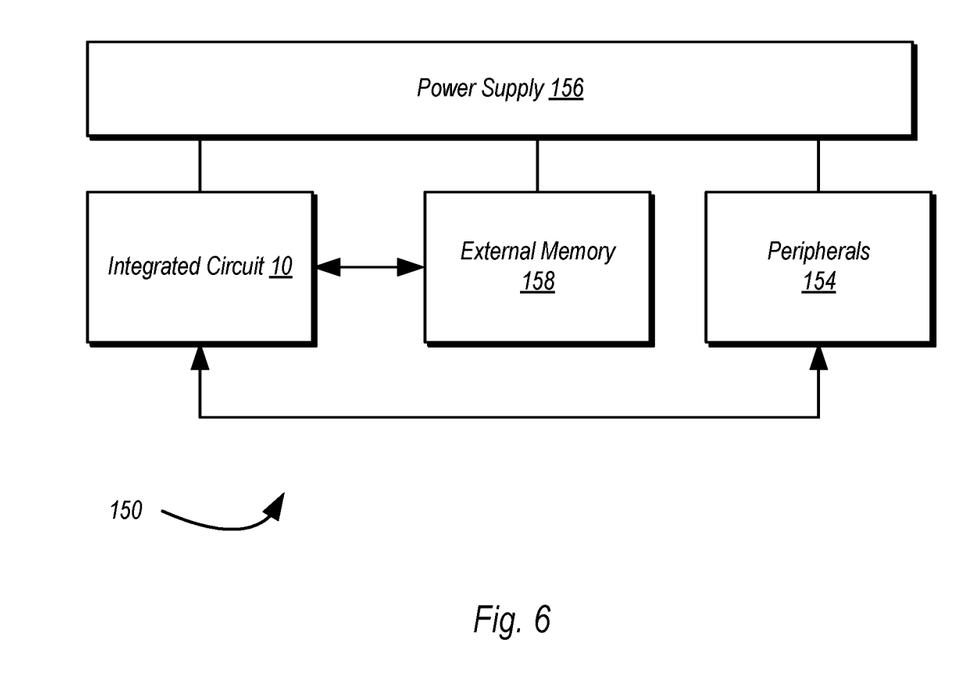
FIG. 6 is a block diagram of one embodiment of an example system.

Turning next to FIG. 6, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

In various embodiments, one or more components of system 150 may include transceiver circuits and components thereof as discussed above in reference to FIGS. 1-3. These circuits may be used as part of systems used transmit signals and detect objects based on reflections of the transmitted signals. Such systems may include circuitry for removing quantization noise, as those shown in FIGS. 1-3.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a transmitter circuit configured to:
receive a digital transmit signal;
quantize the digital transmit signal to generate a quantized signal;
generate an analog transmit signal using the quantized signal; and
transmit a wireless signal using the analog transmit signal; and a receiver circuit configured to:
receive a reflected version of the wireless signal;
generate an analog receive signal using the reflected version of the wireless signal;
generate a digital receive signal using the analog receive signal; and
cancel, using information based on the transmit digital signal and the quantized signal, quantization noise in the digital receive signal to generate a receive output signal, wherein the information based on the transmit digital signal includes a product of a first value of the digital transmit signal at a first time and a second value of the digital transmit signal at a second time, and wherein a difference between the first time and the second time corresponds to a time between transmission of the wireless signal and the receiving of the reflected version of the wireless signal.

2. The apparatus of claim 1, wherein to cancel quantization noise in the digital receive signal, using the information based on the transmit digital signal and the quantized signal, the receiver circuit is further configured to remove, from the digital receive signal, noise corresponding to a noise function.

3. The apparatus of claim 1, wherein the analog transmit signal and analog receive signals are quadrature amplitude modulated (QAM) signals having respective in-phase (I) and quadrature (Q) components.

4. The apparatus of claim 1, wherein the transmitter circuit is further configured to filter the analog transmit signal.

5. The apparatus of claim 1, wherein to transmit the wireless signal using the analog transmit signal, the transmitter circuit is further configured to:
up convert the analog transmit signal to generate the wireless signal; and
drive an antenna using an amplified version of the wireless signal.

6. The apparatus of claim 1, wherein to generate the analog receive signal, the receiver circuit is further configured to mix the reflected version of the wireless signal with the wireless signal.

7. The apparatus of claim 1 wherein the receiver circuit is further configured to filter the analog receive signal.

8. The apparatus of claim 1, wherein the receiver is further configured to convert the receive output signal from a time domain signal into a frequency domain signal.

9. The apparatus of claim 1, further comprising a processing circuit configured to determine presence of an object based on the receive output signal.

10. A method comprising:
quantizing a digital transmit signal to generate a quantized signal;
generating an analog transmit signal based on the quantized signal;
transmitting, from a transmitter circuit, a wireless signal based on the analog transmit signal;
generating, in a receiver circuit, an analog receive signal based on a reflected version of the wireless signal;
generating a digital receive signal based on the analog receive signal; and
generating a receive output signal by canceling, using information corresponding to the transmit digital signal and the quantized signal, quantization noise from the digital receive signal, wherein the information corresponding to the transmit digital signal includes a product of a first value of the digital transmit signal at a first time and a second value of the digital transmit signal at a second time, and wherein a difference between the first time and the second time corresponds to a time between transmission of the wireless signal and the receiving of the reflected version of the wireless signal.

11. The method of claim 10, wherein canceling quantization noise from the digital receive signal comprises the receive circuit removing, from the digital receive signal, noise corresponding to a noise function.

12. The method of claim 10, further comprising the receiver circuit converting the receive output signal from a time-domain signal to a frequency-domain signal.

13. The method of claim 10, wherein the analog transmit signal and the analog receive signal are quadrature amplitude modulation (QAM) signals having respective in-phase and quadrature components.

14. The method of claim 10, further comprising generating the wireless signal by up-converting a carrier frequency of the analog transmit signal using up-conversion circuitry.

15. The method of claim 10, wherein generating the analog receive signal comprises mixing the wireless signal with the reflection of the wireless signal.

16. A system comprising:
a transmitter configured to transmit a wireless signal, wherein the transmitter includes:
a signal source configured to provide a transmit digital signal;
a quantization circuit configured to generate a quantized signal based on the transmit digital signal; and
a digital-to-analog converter (DAC) configured to generate an analog transmit signal based on the quantized signal, wherein the transmitter is configured to generate and transmit a wireless signal using the analog transmit signal;

a receiver configured to receive a reflection of the wireless signal, the receiver including:
- an analog-to-digital converter (ADC) configured to generate a digital receive signal based on an analog receive signal, wherein the analog receive signal corresponds to the reflection of the wireless signal; and
- a compensation circuit coupled to receive information corresponding to the transmit digital signal and the quantized signal, and further coupled to receive digital receive signal, wherein the compensation circuit is configured to generate a receive output signal by compensating for quantization noise in the digital receive signal.

17. The system of claim 16, wherein the compensation circuit is configured to compensate for the quantization noise by removing, from the digital receive signal, noise corresponding to a noise function.

18. The system of claim 16, further comprising a fast Fourier transform circuit configured to convert the receive output signal from a time domain signal into a frequency domain signal.

19. The system of claim 16, wherein the signal source is configured to provide the transmit signal as a digital version of a quadrature amplitude modulated signal having an in-phase component and a quadrature component.

20. The system of claim 16, wherein the receiver includes a mixer coupled to generate the analog receive signal by mixing the analog transmit signal with the reflection of the wireless signal.

* * * * *

UNITED STATES PATENT AND TRADEMARK OFFICE
CERTIFICATE OF CORRECTION

PATENT NO. : 11,237,247 B2
APPLICATION NO. : 16/893938
DATED : February 1, 2022
INVENTOR(S) : Michael Kerner et al.

Page 1 of 1

It is certified that error appears in the above-identified patent and that said Letters Patent is hereby corrected as shown below:

In the Claims

Column 9, Line 44, delete "transmit digital" and insert --digital transmit--

Column 10, Line 32, delete "transmit digital" and insert --digital transmit--

Signed and Sealed this
Twenty-third Day of May, 2023

Katherine Kelly Vidal
*Director of the United States Patent and Trademark Office*